June 23, 1970  P. L. RICHMAN  3,517,298
HARMONIC-INSENSITIVE GATED A.C.-TO-D.C. CONVERTER
Filed July 9, 1968  8 Sheets-Sheet 1

INVENTOR
Peter L. Richman

June 23, 1970  P. L. RICHMAN  3,517,298
HARMONIC-INSENSITIVE GATED A.C.-TO-D.C. CONVERTER
Filed July 9, 1968  8 Sheets-Sheet 2

INVENTOR

*Peter L. Richman*

INVENTOR
Peter L. Richman

FIG. 10

3,517,298
HARMONIC-INSENSITIVE GATED A.C.-TO-D.C. CONVERTER
Peter L. Richman, 22 Barberry Road,
Lexington, Mass. 02173
Filed July 9, 1968, Ser. No. 743,425
Int. Cl. H02m 1/12, 1/14; G01b 19/22
U.S. Cl. 321—9      21 Claims

ABSTRACT OF THE DISCLOSURE

A system for converting a time-varying periodic complex electrical input wave to D.C. with reduced response to selected harmonic distortion components of the wave, the system including a conventional A.C.-D.C. converter, the wave being gated to the converter by switches operated by reference gating signals of the same frequency as the fundamental of the input wave. Additional gating signals are provided for operating switches which gate inputs to the converter so that the gain of the converter is altered between selected phase angles (referred to the reference signals) during each cycle of the reference signals.

---

This invention relates generally to a system for converting the magnitude of a time-varying input signal into a proportional D.C. signal which can then be measured by one of many commercially available D.C. measuring instruments. More particularly, this invention relates to a system of the specified type, wherein the conversion is of a time-varying periodic input signal and is relatively insensitive to harmonically-related distortion frequency components which are in the periodic signal in addition to the basic or fundamental sinusoidal waveform component. The invention is directly applicable, in particular, to situations in which the desired D.C. output is to be proportional to the absolute average value of the periodic, time-varying input signal, and in situations in which the desired D.C. output is to be proportional to the phase-sensitive or gated average value of the periodic, time-varying input signal, the gate signal being a phase reference conventionally at either 0 degrees or 90 degrees of phase shift with respect to the phase shift of the fundamental input wave component at some reference point within the system upon which the measurement is being made.

Known prior art systems which are used to convert the absolute average, or the phase-sensitive or gated average value of a time-varying periodic input signal into a D.C. output signal proportional to the input signal, usually utilize an inverting amplifier employing either vacuum-tube or semiconductors, followed by alternately-operating gates employing diodes or transistors, either by themselves or within one or more feedback loops, to obtain the required full-wave and gated or phase-sensitive averaging functions. A low-pass filter is used to eliminate remaining ripple components of the original time-varying periodic input signal from the output D.C. signal which results from the gated-averaging circuits. Such converter systems are sometimes referred to by those working in the art as gated average-to-D.C. converters.

Converters of the type described find application and use as phase-sensitive A.C. meters, synchronous detectors and so-called lock-in amplifiers; and find use as well as signal conditioning input converters for D.C. digital voltmeters, differential (or potentiometric) voltmeters and phase-angle voltmeters.

In such prior art converter systems, high accuracies are obtainable for the conversion—that is, good stability and linearity of output D.C. with respect to the input A.C.—for periodic, time-varying input signals that are essentially pure sine waves, virtually uncontaminated by distortion components which are harmonically-related to the basic or fundamental input sinusoidal wave. In such circumstances, the converter's output D.C. accurately represents the gated or phase-sensitive average value of the periodic, time-varying input A.C. However, what is usually desired in most practical applications is a measurement which remains invariant even in the face of 5% or more of total harmonic distortion superimposed on the input fundamental A.C. waveform.

One way that is used to circumvent the problem in prior art systems is to use A.C.-to-D.C. converters that are inherently responsive to the R.M.S. value of the input wave, instead of to the average value. Such R.M.S. converters as they are called are typically based on the operation of thermally-sensitive devices such as thermocouples or thermistors, since the R.M.S. value of a wave is essentially a measure of its heating effect. Such devices tend to be inaccurate, slow, sensitive to overload (resulting in burnout or destruction of the thermally-sensitive element), and unstable both with time and with ambient temperature changes; more important still, there is no way of computing a gated or phase-sensitive R.M.S. over a reasonable frequency range.

Another way that is used to circumvent the problem of A.C.-to-D.C. converter harmonic sensitivity in the prior art is to precede the converter by a band-pass filter, tuned to the fundamental of the input wave. Thus, an output D.C. proportional to the phase-sensitive average value of the fundamental wave component of the input A.C. is obtained at the output of the converter, since the converter's input is only that wave which passes through the tuned filter, namely the basic or fundamental component of the input A.C. This approach, however, has major disadvantages which severely limit its application. First, the phase shift for the fundamental signal itself, when passed through the filter to eliminate its harmonics, is relatively unstable with both time and temperature. Hence, two filters must be employed, one for the gate or reference and one for the input channel, and their phase characteristics must be exactly matched, a difficult requirement over even a narrow frequency band. In addition, filter insertion loss, too, tends to be unstable both with time and with changes in ambient temperature. The resulting phase shift and insertion loss uncertainties make it difficult to obtain and maintain high accuracies in such a system in a practical implementation.

The present invention therefore has as a principal object the provision of a high-precision gated or phase-sensitive A.C.-to-D.C. conversion device adapted to provide a D.C. output which exhibits a high degree of insensitivity to input wave components which are harmonically related to the fundamental input wave component.

Another principal object of the present invention is to provide a device of the type described for providing an output which is particularly insensitive to input wave components odd-harmonically related to the fundamental input wave component and in a basically in-phase relationship with a reference or gating waveform employed for the gated or phase-sensitive conversion.

Another object of the present invention is to provide a device of the type described for providing a D.C. output related to the average value of the fundamental frequency component of the input waveform, gated by a reference wave or averaged over a period determined by a reference wave so as to become a phase-sensitive average (even when that fundamental amplitude itself approaches or becomes zero) in a manner that is highly insensitive to harmonic contamination on the input wave.

Yet another object of the present invention is to provide a device of the type described characterized by its capability for general use, ranging from application in simple ¼% to 1% analog and digital mulitmeters and A.C. null meters, to high-precision application as 0.01% to 0.1% phase-sensitive A.C.-to-D.C. converter signal conditions for digital and differential (potentiometric) voltmeters, phase-angle voltmeters, lock-in amplifiers and other synchronous detectors, with possibility of extension to use in 5 and 10 part-per-million precision A.C.-to-D.C. conversion equipment used in monitoring precision A.C. signals such as those used to drive the various inputs to low-drift gyroscopes employed in navigational systems.

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

Broadly described, the present invention is a device for generating, from the time-varying, periodic composite A.C. input signal consisting of a fundamental wave and related harmonic components, a D.C. output signal proportional to the phase-sensitive or gated average value of the fundamental input signal, with a high degree of insensitivity to the harmonic components of the fundamental component of the input wave. Briefly, this is accomplished by changing the gain of the gated-averager at specific times to at least two specific different finite values, during each fundamental cycle of the reference gate, in such a manner as to reduce or eliminate the effects of one or more specific harmonics in a manner to be hereinafter described.

In one mode of operation, the basic reference gate signals for the conversion, as well as the gain-changing gate signals—the signals that indicate to the converter when its gain should be modified—are derived from the input signal itself. In this case, a so-called whole average or whole-signal average is obtained, i.e., an absolute average, since by definition the ordinary, non-absolute average of an A.C. wave is zero.

In the phase-sensitive mode of operation on the other hand, both the basic reference gate signals and the gain-changing gate signals are supplied from a reference signal source which is at the same frequency as, but not necessarily at the same phase shift as the input signal itself, and which is not necessarily sinusoidal in waveshape. The reference conventionally either at 0 degrees or at 90 degrees of phase shift with respect to the phase shift of the fundamental input wave component at some reference point within the system upon which the phase-sensitive A.C. measurement is being made, producing either an in-phase os a quadrature phase-sensitive A.C.-to-D.C. conversion respectively. The fundamental component of the input signal itself to the A.C.-to-D.C. converter is at any arbitrary phase shift over the full range from 0 to 360 degrees.

Figures 1A, 1B:
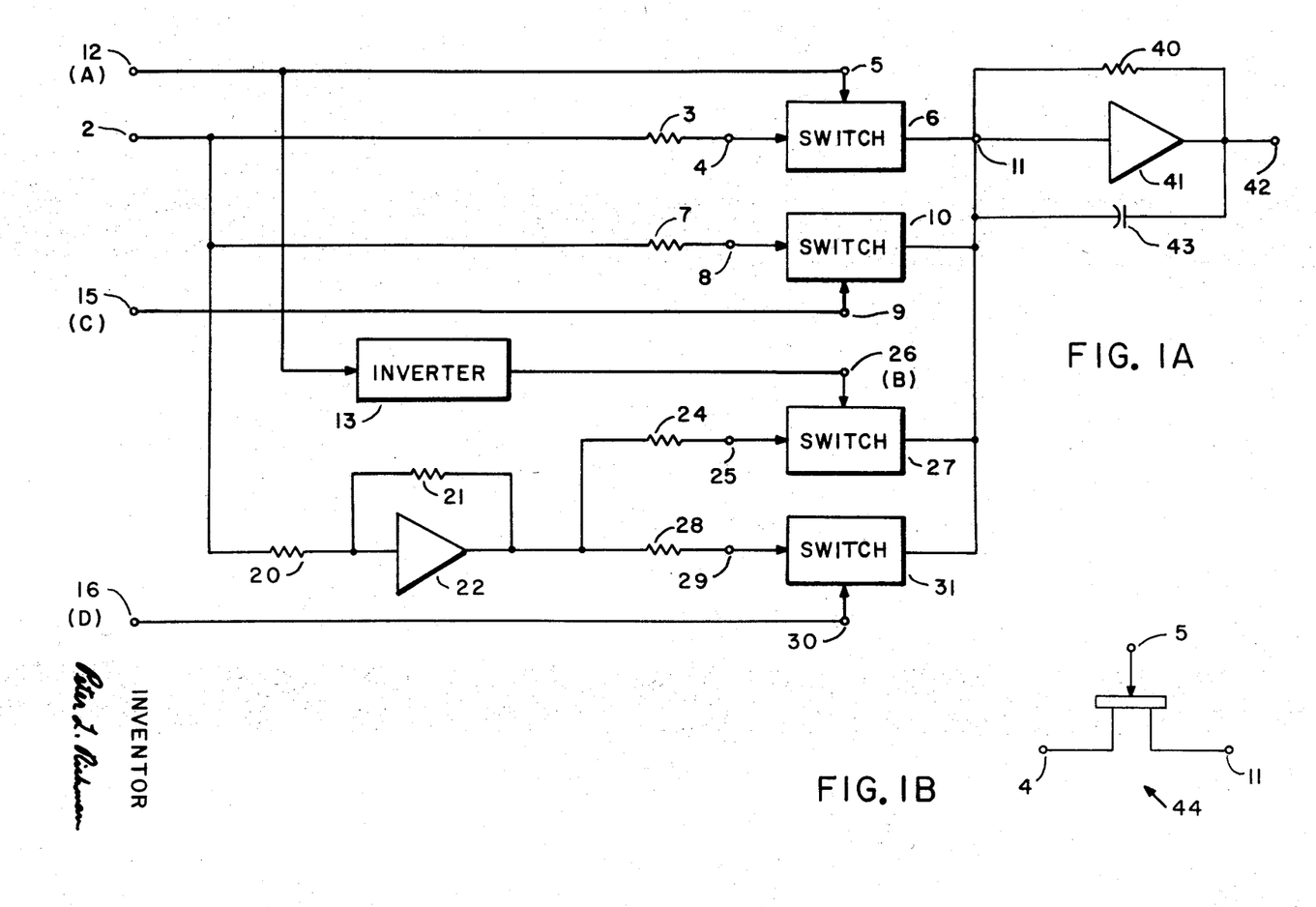
FIGS. 1A and 1B are a combination block-schematic diagram illustrating one form of the present invention.
Figure 2:
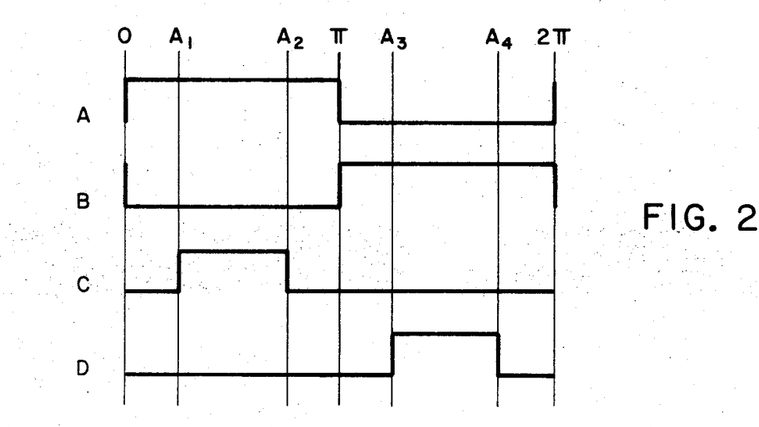
FIG. 2 is a graphical representation of exemplary waveforms of the circuit of FIG. 1.

Referring now to FIG. 1A, there is shown a combination block-schematic diagram illustrating the present invention. FIG. 2 shows exemplary waveforms occurring during operation of the circuit of FIG. 1A. In FIG. 1A, there is provided input terminal 2, to which is applied the A.C. signal for which a proportional D.C. output representation is required. This input is conveyed, via input resistive coupling means 3 to main switch 6. The latter serves to connect its input terminal 4 at one end of resistive means 3 to the summing junction 11 of operational amplifier 41, whenever the wave applied as control signal to control terminal 12 is positive—or from 0 to $\pi$ in FIG. 2A as shown.

At the same time, the same input signal applied to terminal 2 is applied to a polarity-inverter comprising input resistor 20, high-gain amplifier 22 and feedback resistor 21, such that the output of amplifier 22 is an exact replica of the A.C. input applied to terminal 2, except with the opposite sign. For a fuller description of the operation of the conventional inverting unity-gain operational amplifier 22 and its associated input and feedback resistors, reference may be had to the text Electronic Analog Computers, by Korn and Korn, McGraw-Hill Book Company, second edition, 1956, section 1.3, on pages 12 through 15.

The output from amplifier 22, opposite in polarity but equal in magnitude to the input applied to terminal 2, is conveyed via resistive coupling means 24 to main switch 27. The latter serves to connect its input terminal 25 to the summing junction 11 of amplifier 41, whenever the wave applied as control signal to terminal 26 of switch 27 is positive—or from $\pi$ to $2\pi$ in FIG. 2B. The wave on control terminal 26 of switch 27 is, as shown in FIG. 2B, merely the inverted wave of FIG. 2A. It is applied as the control signal to switch 6 as hereinbefore described, and is provided by another inverter 13 as shown in FIG. 1A.

The sum of the currents supplied to the summing junction 11 of amplifier 41 from switches 6 and 27 must flow through feedback resistor 40 of that same amplifier, in parallel with feedback capacitor 43. Resistors 3 and 24 thus constitute gated input summing resistors for operational amplifier 41, and in the absence of switches 10 and 31 with their associated input resistors 7 and 28, would create at the output of amplifier 41, a D.C. representation of the gated or phase-sensitive average value of the input wave applied to terminal 2; the wave of FIG. 2A, applied to terminal 12 of FIG. 1A, would then be the so-called phase reference. This would constitute a prior art phase sensitive converter and output of the amplifier 41 would be a D.C. potential, in view of the R-C feedback network of the amplifier. The R-C network serves as a low impedance in the feedback path for A.C. components of the output signal, while passing a D.C. potential equal to the average of the total, gated, composite amplifier input signal. For a fuller description of operational amplifiers employed as integrators and filter amplifiers, see Korn and Korn, op. cit.

Figure 3:
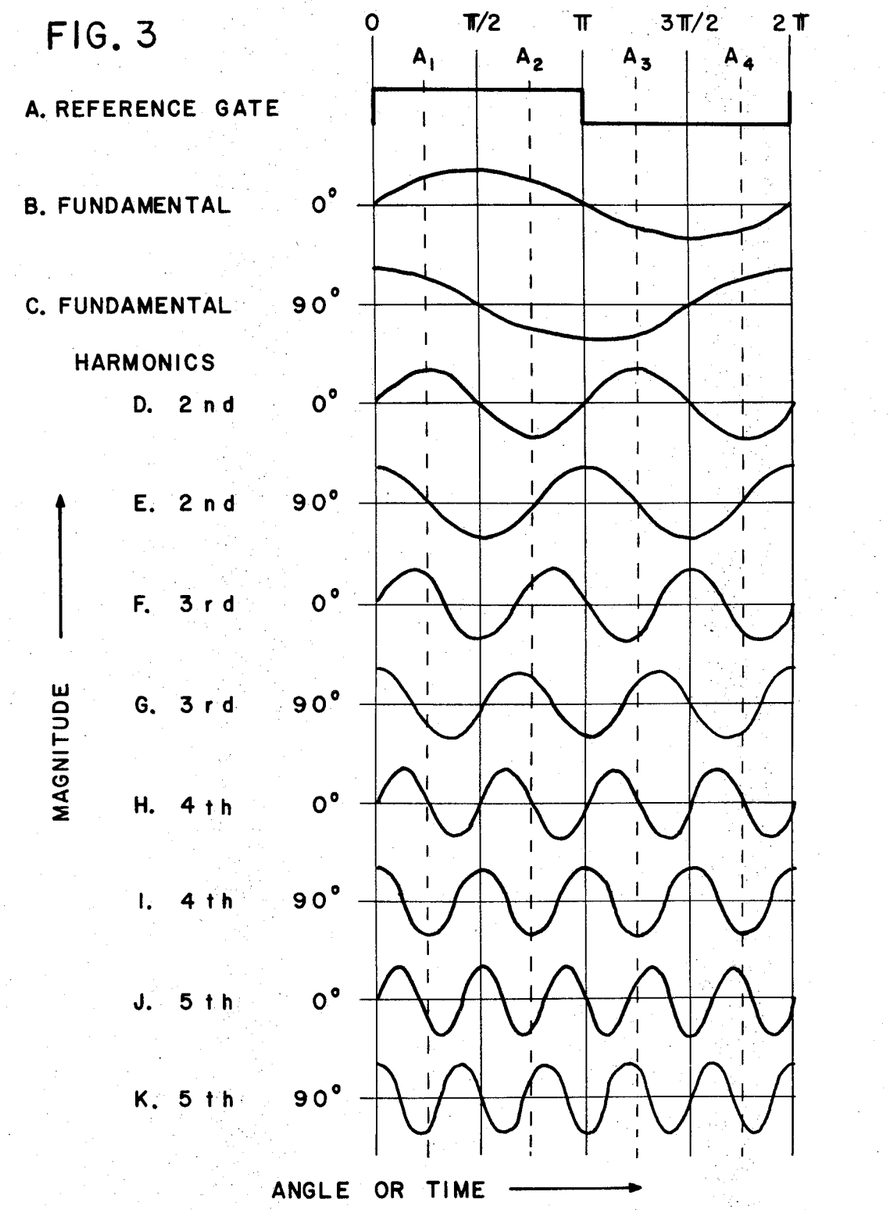
FIG. 3 is a graphical representation showing an exemplary reference gate waveform, with exemplary fundamental and harmonic contamination wave components.

With reference now to FIG. 3, there is shown in FIG. 3A the same reference gate signal of FIG. 2A, while FIGS. 3B and 3C show 0 degree and 90 degree forms of the fundamental signal that might be applied to input terminal 2 in FIG. 1A.

For the 0 degree fundamental of FIG. 3B, the average during the segment from 0 to $\pi$ is positive, while the inverted average (due to inverting amplifier 22 in FIG. 1A) of the signal from $\pi$ to $2\pi$ is also positive, yielding the familiar result that the phase-sensitive average of an in-phase or 0 degree fundamental in the prior art is equal to the conventional, full-wave absolute average.

For the 90 degree or quadrature fundamental of FIG. 3C, the average during both segments, 0 to $\pi$ (when switch 6 in FIG. 1A is closed) and $\pi$ to $2\pi$ (when switch 27 is closed) is zero, since in each of said segments there are equal and opposite polarity portions of the input sinusoid, whose areas cancel.

The prior art phase-sensitive A.C.-to-D.C. converter just described in connection with FIG. 1A has however with respect to the harmonic contamination shown in FIGS. 3D through 3K, an excessive sensitivity with regard to the 0 degree odd harmonics as will be shown hereinafter. To eliminate or diminish this sensitivity, referring again to FIG. 1A, gates or switches 10 and 27 selectively connect the input from terminal 2 and its inverted replica at the output of amplifier 22, via resistors 7 and 28 respectively, to the summing junction 11 of amplifier 41, during the times that gate signals applied to terminals 9 and 30 of switches 10 and 31 respectively are positive. These gate signals derive from input terminals 15 and 16 respectively, at which waves C and D as indicated from FIGS. 2C and 2D respectively, are applied. It should be noted that while the gating signals are shown for exemplary purposes as rectangular waveforms, a number of which can be considered a group of signals, other forms of signals, such as pulses, are also useful. In this regard then, the leading and trailing edges of a rectangular waveform are equivalent to two pulses and can also be considered a group of signals. Wave C applied via terminal 15 to input terminal 9 of switch 10, supplies additional gain for the input signal applied to terminal 2, during the interval in which the wave of FIG. 2C is positive as hereinbefore described, or from the angle $A_1$ to the angle $A_2$ in FIG. 2, as indicated. In a similar manner, wave D, applied via terminal 16 to the input terminal 30 of switch 31, supplies additional gain for the inverted input signal at the output of amplifier 22, during the interval in which the wave of FIG. 2D is positive as hereinbefore described, or from the angle $A_3$ to the angle $A_4$ in FIG. 2, as indicated. The gain is additional in both cases, in view of the fact that when the appropriate switch is closed, either input resistor 7 is paralleled with input resistor 3, or else input resistor 28 is paralleled with input resistor 24. From Korn and Korn, op. cit., this results in an increase in gain to the associated input signal. The amount of the gain increase is in each case determined by the ratio of the additional input resistor to the original input resistor for each phase of the reference gate; i.e., the ratio of resistors 7 and 3 for the portion of the reference gate from 0 to $\pi$, and the ratio of resistors 28 and 24 for the portion of the reference gate from $\pi$ to $2\pi$.

The angles $A_1$ and $A_2$, plus $A_3$ and $A_4$ may be set so as to obtain complete rejection of 0 degree third and fifth harmonics, for example, in a manner that is to be described, and which constitutes a portion of the instant invention. The amount of the gain change during the times that switches 10 and 31 are closed will also be hereinafter described.

Switches 6, 10, 27 and 31 may be of many types, including diode bridges, bi-polar transistor switches, field-effect transistor switches and others. For exemplary purposes, a field effect switch is shown in FIG. 1B, for switch 6: with terminals 4, 5 and 11 in FIG. 1B showing the points which, in FIG. 1A, would be connected to the field-effect transistor 44 when it is substituted for the switch 6. When the gate of the transistor, connected to terminal 5, is at the same potential as the source (either terminal 4 or terminal 11, interchangeably), the field-effect transistor's resistance between terminals 4 and 11 is extremely low, typically as low as twenty or thirty ohms for high quality types. For values of the resistors 3, 7, 24 and 28 of 10,000 ohms and higher, this series transistor resistance is small, and may be readily compensated for by slightly modifying the values of the resistors 3, 7, 24 and 28.

When the gate electrode, connected to terminal 5 of FIG. 1B is five to ten volts negative with respect to terminals 4 and 11 (the source and drain (interchangeably) of the field effect device), the resistance between said source and drain is on the order of 1000 megohms or higher. For a fuller description of the performance of field effect transistors in switching circuits, reference should be made to the text Field Effective Transistors, by Leonce J. Sevin, Jr., McGraw Hill Book Company, 1965, section 4.3, on pages 89 through 92.

The basic, conventional portion of the embodiment of FIG. 1A, that is all of the circuitry with the exception of switches 10 and 31 with associated resistors 7 and 28, may be readily modified to compute the gated or phase-sensitive average of the input signal applied to terminal 2, over but a single cycle or only several cycles of the input signal, thereby furnishing an output D.C. proportional to the phase-sensitive average of said input in a minimum of elapsed time, that is without waiting for a filter to settle. This modification can conventionally be carried out by relacing the feedback resistor 40 of amplifer 41 with another switch, and gating that switch open during the cycle or cycles of the reference wave of FIG. 2A during which the average is to be computed. The resulting potential on the output of amplifier 41 would then be the integral of the gated input over the cycle or several cycles for which the feedback gate was opened; if all input switches 6, 10, 27 and 31 were then opened, the output potential would remain at the attained value. The output potential stored on the capacitor 43 in the feedback path of amplifier 41, and available at terminal 42, may then be divided in one of a number of ways known to those skilled in the art, and covered in Korn and Korn, op. cit., by the time interval during which the input was integrated, yielding the average of the input signal during that interval.

Use of the auxiliary gates or switches 10 and 31 with their associated resistors 7 and 28 in the manner already described in connection with the normal functioning of the harmonic-insensitive converter of FIG. 1A, in the modified implementation just described for a single-cycle averaging process, will then yield the same harmonic-insensitivity for the single-cycle, integrate and divide-by-time averaging process implementation as for the more standard and economical implementation shown explicitly in FIG. 1A.

Referring now to FIG. 3, there will be seen a graphical representation of a reference gate signal as well as input signal fundamental in-phase or 0 degree and quadrature or 90 degree waves, with exemplary second, third, fourth and fifth harmonic wave components, all of the second through fifth harmonic components also being shown both in their sine or 0 degree and cosine or 90 degree phase shifts with respect to the fundamental.

Throughout the entire discussion which follows, it is assumed that any statements that hold true in general for 0 degree waves or for 90 degree waves, hold true with equal force for 180 degree and 270 degree waves respectively.

As is well known to those skilled in the art, Fourier analysis shows that a sine wave of any phase shift may be synthesized by adding two other sine waves of the same frequency and appropriate amplitude, one of the aded waves to be at either 0 or 180 degree phase shift, the other wave at either 90 or 270 degree phase shift. For this reason it is sufficient in consideration of the effects of harmonics on a computation such as an average or a phase-sensitive average computation, to be concerned merely with a sine (the 0 to 180 degree phase shift wave) at each harmonic, and the cosine (the 90 or 270 degree phase shift wave) at each harmonic, to be able completely to characterize the effects of the harmonics on the computation. And since there is no functional difference between 0 degree and 180 degree waves, and between 90 degree and 270 degree waves, it is sufficient merely to consider 0 degree and 90 degree waves to be able to completely characterize the effects of the harmonics on the A.C.-to-D.C. conversion.

FIG. 3A shows the reference gate signal; FIGS. 3B and 3C show 0 and 90 degree phases respectively of the fundamental; FIGS. 3D and 3E show 0 and 90 degree phases respectively for the second harmonic; FIGS. 3F and 3G show 0 and 90 degree phases respectively of the third harmonic; FIGS. 3H and 3I show 0 and 90 degree phases respectively of the fourth harmonic; while FIGS. 3J and 3K show 0 and 90 degree phases repectively of the fifth harmonic. While additional harmonics, of still higher order, may exist in the input signal in the general case, performance with respect to them for the Harmonic-Insensitive Gated A.C.-to-D.C. Converter may be readily inferred from that associated with the first four (second through fifth) which are depicted in FIG. 3.

The relative magnitudes of the fundamental and its harmonics in FIGS. 3B through 3K are merely exemplary, and are not meant to be representative of every situation for which the instant invention is intended to perform. Rather, the invention, particularly in its whole average or whole signal average form, is of interest and is applicable typically when the magnitudes of the various harmonics with respect to the fundamental signal are fairly small, on the order of five percent to ten percent. However the invention in its phase-sensitive form performs satisfactorily for any ratio of harmonics to fundamental, as will be necessary in the case of an A.C. phase-sensitive null meter in which the fundamental disappears completely at null, leaving only the harmonics themselves.

If an in-phase or 0 degree even harmonic such as the second or fourth (FIGS. 3D or 3H) be integrated or averaged during either half of the reference gate cycle FIG. 3A, for example, the net result will be zero. This follows from the fact that within each half cycle of the reference gate of FIG. 3A, there are two equal and opposite polarity half cycles of the 0 degree second harmonic shown in FIG. 3D and two sets of two equal and opposite-polarity half cycles of the 0 degree fourth harmonic shown in FIG. 3H, and so on by inference for all higher order, 0 degree or in-phase even harmonics.

The same situation is true, i.e. positive and negative cycles and portions of cycles exactly cancel during each half cycle of the reference gate signal, for the 90 degree even harmonics, specifically for the 90 degree second harmonic shown in FIG. 3E and the 90 degree fourth harmonic shown in FIG. 3I; and inspection of FIGS. 3G and 3K for the 90 degree third and fifth harmonics respectively, again shows cancellation for all positive and negative cycles and portions of cycles, during each half cycle of the reference gate signal.

Thus the effect on gated or phase-sensitive average value of all harmonics save the 0 degree odd harmonics, by inference from performance for the second through fifth harmonics shown in FIGS. 3D through 3K, is zero. As can be seen from FIG. 3F, during the first half cycle of the reference gate signal there are three half cycles of the 0 degree third harmonic. While the first two cancel since they are opposite in polarity, the third introduces a substantial change into a composite signal comprising the gated average value of either the 0 degree or the 90 degree fundamental (FIG. 3B or 3C) and the 0 degree third harmonic, gated over either or both half-cycles of the reference gate signal. It is in fact a positive change for the situation shown as exemplary in FIGS. 3A and 3F during the first half cycle of the reference gate, since the one-half cycle of the 0 degree third harmonic of FIG. 3F that is left over is positive-going. If the phase of the FIG. 3F signal were taken instead as 180 degrees instead of 0 degrees as shown, the residual one-half cycle of the third harmonic during the first half cycle of the reference gate signal would become negative, and the value of a composite average taken over the first half cycle of the reference gate signal would be decreased instead of increased as a consequence. An analogous situation obtains for the second half cycle of the reference gate signal, except that as hereinbefore described, the operation of the phase-sensitive converter serves to invert the polarity of the input wave and all of its harmonics during the second half of the reference gate signal, before applying them to the averaging detector.

Specifically, the full wave average value $E_{AV}$ of an exemplary, composite wave made up of a 0 degree fundamental as in FIG. 3B, and the $n^{th}$ harmonic at 0 degree phase shift with respect to the fundamental, for $n$ odd, wherein the peak amplitude of said fundamental is $e_1$ and the peak amplitude of the said $n^{th}$ harmonic is $e_n$, taken over both half-cycles of the reference gate signal with opposite polarities, is given by:

$$E_{AV} = (1/2\pi) \left[ \int_0^\pi (e_1 \sin A + e_n \sin nA) dA - \int_\pi^{2\pi} (e_1 \sin A + e_n \sin nA) dA \right] \quad (1)$$

where $A$ is the running variable of integration—angle in this case, and Equation 1 is merely a statement of the definition of the full wave average, namely the integral over the first half period (0 to $\pi$) minus the integral over the second half period ($\pi$ to $2\pi$), divided by the total period $2\pi$.

Integration and reducing Equation 1 yields $$E_{AV} = (2/\pi)e_1 + (2/\pi)(e_n/n) \quad (2)$$

The fractional effect, $d_n$, of the $n^{th}$ harmonic, where $n$ is odd, on the conventional phase-sensitive average value $E_{AV}$ given above, may be conveniently defined as the ratio of the $e_n$ term to the $e_1$ term in Equation 2, or:

$$dn = \frac{1}{n}\frac{e_n}{e_1} \quad (3)$$

Thus the effect of a 0 degree, $n^{th}$, odd harmonic on the conventional full-wave, gated average value of a composite wave made up of the 0 degree fundamental and that harmonic, is $1/n$ times the relative amplitudes of the harmonic and the fundamental; in other words, 5% third harmonic yields 5/3% effect on the average, and so forth.

The embodiment of instant invention depicted in FIG. 1A operates by carrying out the averaging process not only for each of the two entire half cycles from 0 to 180 degrees and from 180 to 360 degrees of the reference gate, but from $A_1$ to $A_2$ and from $A_3$ to $A_4$ (in FIGS. 2 and 3) with an increased gain, equal to $(1+B)$. If the converter gain between $A_1$ and $A_2$ and between $A_3$ and $A_4$ is increased to $(1+B)$, then the terms which will be required to be added to the expression in Equation 2 for $E_{AV}$ will be, from the same reasoning that yields Equation 1, $$E_{AV_{addt'l}} = \frac{1}{2\pi}\left[\int_{A_1}^{A_2} B(e_1 \sin A + e_n \sin nA) dA - \int_{A_3}^{A_4} B(e_1 \sin A + e_n \sin nA) dA\right] \quad (4)$$

Now let $A_1$ and $A_2$ be symmetrically located about $\pi/2$, or $$A_2 = \pi - A_1 \quad (5)$$

Further, let $A_3$ and $A_4$ bear the same relationship to $3\pi/2$ that $A_1$ and $A_2$ bear to $\pi/2$, respectively, namely $$A_3 = \pi + A_1 \quad (6)$$

and $$A_4 = 2\pi - A_1 \quad (7)$$

Integrating and reducing Equation 4 with the aid of Equations 5, 6 and 7 yields:

$$E_{\text{AVaddl'l}} = B(2/\pi)(e_1 \cos A_1 + (e_n/n) \cos nA_1) \quad (8)$$

The sum of Equations 2 and 8 yields the total for the output of the harmonic-insensitive gated converter, $$E_{\text{AVTOT}} = (2/\pi)e_1 + (2/\pi)(e_n/n) + B(2/\pi)(e_1 \cos A_1 + (e_n/n) \cos nA_1) \quad (9)$$

Collecting terms in $e_1$ and $e_n$, Equation 9 becomes:

$$E_{\text{AVTOT}} = e_1(2/\pi)(1 + B \cos A_1) + e_n(2/\pi(1/n)(1 + B \cos nA_1) \quad (10)$$

For the effect of the $n^{\text{th}}$, 0 degree phase shift, odd, harmonic to be zero on the new, composite average given by Equation 10, the coefficient of $e_n$ in Equation 10 must be zero; or, $$(2/\pi(1/n(1 + B \cos nA_1)) = 0 \quad (11)$$

or $$1 + B \cos nA_1 = 0 \quad (12)$$

For both third and fifth harmonics both to have zero influence, Equation 12 must hold for $n=3$ and $n=5$ simultaneously, for example.

Solving for $\cos nA_1$ from Equation 12, $$\cos nA_1 = -(1/B) \text{ for } n=3, 5 \quad (13)$$

Since $B$ is taken positive by assumption, Equation 13 states that $\cos nA_1$ is negative for both 3rd and 5th harmonics, or that $3A_1$ and $5A_1$ are each in quadrant II or III, where the cosine is negative.

Assuming $3A_1$ is in quadrant II, and $5A_1$ is in quadrant III, and further that they are symmetrically disposed about $\pi$ so that Equation 13 will be satisfied simultaneously for both, i.e. their cosines are equal, we may state:

$$3A_1 = \pi - x \quad (14)$$

and $$5A_1 = \pi + x \quad (15)$$

Equations 14 and 15 express the fact that $3A_1$ and $5A_1$ are symmetrically disposed about the angle $\pi$. The sum of Equations 14 and 15 is:

$$8A_1 = 2\pi \quad (16)$$

from which it follows that $$A_1 = \pi/4 \quad (17)$$

Thus by selecting $A_1 = \pi/4$, and from Equations 5, 6 and 7, $A_2 = 3\pi/4$, $A_3 = 5\pi/4$ and $A_4 = 7\pi/4$, the embodiment of FIG. 1A, with waveforms as shown in FIG. 2, may be made insensitive to both 0 degree third and fifth harmonics simultaneously.

In fact, the embodiment of the instant invention may be made insensitive to any two, 0 degree odd harmonics. If we consider the $i^{\text{th}}$ and $j^{\text{th}}$ harmonics, $i$ and $j$ both odd, and let $iA_1$ be in quadrant II and $jA_1$ be in quadrant III, $$iA_1 = \pi - x \quad (18)$$

and $$jA_1 = \pi + x \quad (19)$$

The sum yields:

$$(i+j)A_1 = 2\pi \quad (20)$$

or $$A_1 = 2\pi/(i+j) \quad (21)$$

so that, for example, if it is desired to desensitize the phase-sensitive average conversion to third and seventh harmonics, from Equation 21 $A_1$ would be $\pi/5$.

If third and fifth are the selected harmonics (as will usually be the case since they predominate in actual measurement situations and their effect is greatest since their harmonic numbers are the lowest), then every alternate adjacent pair of odd harmonics are also eliminated from influencing the total gated average: i.e., eleventh and thirteenth, nineteenth and twenty-first, and so on. This may be seen from the fact that if Equation 12 is true for $n=3$ and $5$, implying $A_1 = \pi/4$ as already shown, then it follows from Equation 12 that:

$$1 + B(-\sqrt{2}/2) = 0 \quad (22)$$

since $\cos 3\pi/4 = \cos 5\pi/4 = -\sqrt{2}/2$. Solving Equation 22 for $B$ yields:

$$B = \sqrt{2} \quad (23)$$

Hence Equation 12 is true for all $n$ that imply that $\cos nA_1$ is $-\sqrt{2}/2$ as stated in Equation 13. But for $A_1 = \pi/4$, $\cos nA_1$ is $-\sqrt{2}/2$ for $n=11, 13, 19, 27, 29$ and so forth.

Regarding the scale factor of the output D.C. from the phase-sensitive A.C.-to-D.C. converter with respect to the input A.C., the term in $e_1$ in Equation 10, versus the term in $e_1$ in Equation 2, supplies the ratio R:

$$R = (2/\pi)(1 + B \cos A_1)/(2/\pi) \quad (24)$$

Substituting for $A_1$ and $B$ from Equations 17 and 23 respectively and simplifying, yields:

$$R = 2 \quad (25)$$

Thus to restore the normal relationship, i.e., $R=1$, for the output D.C. to the input A.C., a scale factor reduction of 2:1 is required for the over-all A.C.-to-D.C. converter incorporating gain-enhancement by the factor $(1+\sqrt{2})$ from $\pi/4$ to $3\pi/4$, and from $5\pi/4$ to $7\pi 4$, as described as exemplary figures for the instant invention.

Other gain-changing techniques, employing different times during the cycle of the reference gate and with different gain ratios, may be employed to achieve similar effects of reduction in harmonic sensitivity for the A.C.-to-D.C. conversion process.

That invariance is maintained even with gain enhancement from $A_1$ to $A_2$ and from $A_3$ to $A_4$ in FIGS. 2 and 3, with respect to 0 degree even and 90 degree odd harmonics, is clear by inspection of FIG. 3. Since $A_1$ and $A_2$ are symmetrically disposed about $\pi/2$ and $A_3$ and $A_4$ are symmetrically disposed about $3\pi/2$ as hereinbefore described, the integral or average from $A_1$ to $A_2$ or from $A_3$ to $A_4$ of the 0 degrees second harmonic of FIG. 3D for example, is zero; as is the integral or average from $A_1$ to $A_2$ or from $A_3$ to $A_4$ of 0 degree fourth harmonic of FIG. 3H, 90 degree third harmonic of FIG. 3G and 90 degree fifth harmonic of FIG. 3K. However, it is necessary to perform the phase-sensitive averaging in a full-wave manner as hereinbefore described, i.e., taking the integral or average in the first half of the reference gate signal and subtracting the integral or average in the second half of the reference gate signal, as set forth in Equation 1, in order to maintain invariance with respect to 90 degree even harmonics.

This may be seen with reference to FIG. 3E, for instance, for 90 degree second harmonic. The integral from $A_1$ to $A_2$ is not zero for this harmonic, but it is equal to the integral from $A_3$ to $A_4$. Thus when the latter integral is subtracted from the former, as in Equation 1, the effect of the 90 degree second—and 90 degree even harmonics of any order by inference—cancels, leaving the resulting phase-sensitive average as invariant to all even and 90 degree odd harmonics as is a conventional phase-sensitive average conversion, while supplying an invariance for at least two 0 degree odd harmonics as well, as hereinbefore described.

Figure 4:
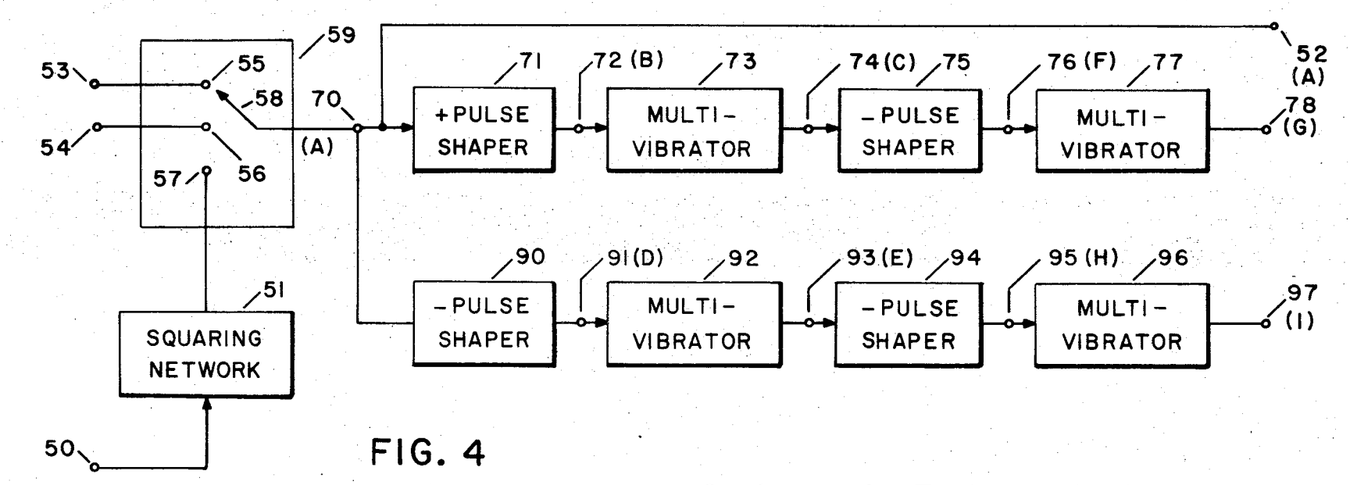
FIG. 4 is a combination block-schematic diagram of one method of obtaining some of the input waveforms required for the embodiment of FIG. 1.
Figure 5:
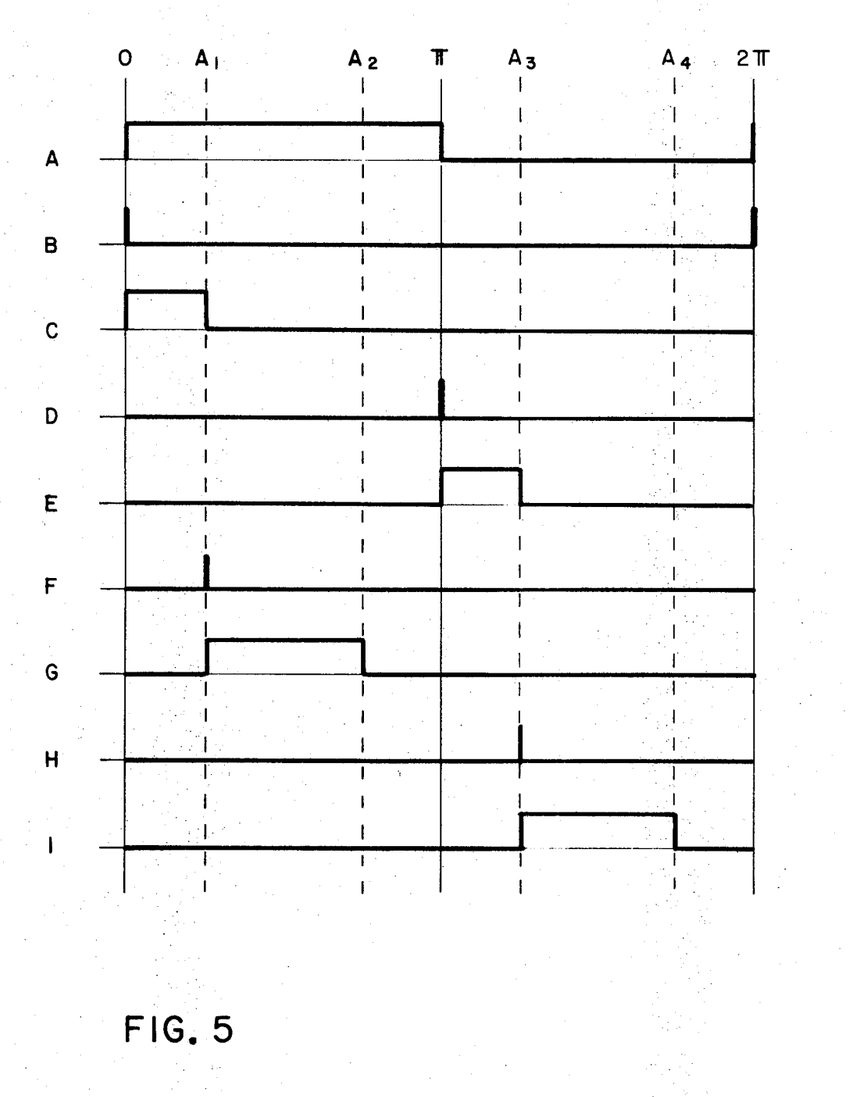
FIG. 5 is a graphical representation showing exemplary waveforms of the circuit of FIG. 4.

Referring now to FIG. 4, there is shown an exemplary system for generating the required waveforms of FIG. 2A, 2B, 2C and 2D, for use in connection with the embodiment of FIG. 1A as hereinbefore described. FIG. 5 shows exemplary waveforms arising during operation of the embodiment of FIG. 4.

In FIG. 4, switch 59 selects among three basic phase references or gating inputs, as applied respectively to terminals 53, 54 and 50 of that embodiment. The wave applied to terminal 50 is the same quasi-sinusoidal input applied as input to terminal 2 of FIG. 1A, so that it must be shaped into a square wave by the squaring network 51 of FIG. 4 before application to the switch 59. The other two inputs to the switch 59, applied to terminals 53 and 54 in FIG. 4 respectively, are in-phase and out-of-phase or quadrature square waves respectively.

Switch 59 selects which of the three aforementioned phase references, applied respectively to switch 59 terminals 55, 56 and 57, will be transmitted via arm 58, to the switch output terminal 70. This selected square wave phase-reference on terminal 70 shown as the waveform of FIG. 5A is furnished as an output at terminal 52 in FIG. 4, is intended for application to terminal 12 in FIG. 1A, the main gate input. This waveform is arbitrarily designated as positive from 0 to $\pi$ in FIG. 5A (and FIG. 2A), and 0 from $\pi$ to $2\pi$.

The positive-going edge of the square wave at terminal 70 also actuates (+) pulse shaper 71, whose output at terminal 72, shown as FIG. 5B, is a pulse coincident with the positive-going edge of the square wave at terminal 70 which actuates the shaper. This positive pulse triggers delay multivibrator 73, in conventional manner as is well known to those skilled in the art. The output from the delay multivibrator 73 is a longer pulse as shown in FIG. 5C, whose leading or positive-going edge is coincident with the triggering pulse of FIG. 5B which triggers it, and whose trailing or ground-returning edge occurs at an angle $A_1$, which is a function of the delay built into the delay multivibrator 73. For a further description of delay multivibrators and similar circuits, see the text Transistor Circuit Design by the Engineering staff of Texas Instruments Incorporated, McGraw Hill Book Company, 1963, with particular reference to pages 380–383 for one-shot multivibrators.

The output of the delay multivibrator 73, at terminal 74, and as shown in FIG. 5C, is shaped by pulse shaper 75 which generates a sharp triggering pulse (shown in FIG. 5F) coincident with the trailing or ground-returning edge of the waveform of FIG. 5C. This pulse, appearing at terminal 76 at the output of the pulse shaper 75, triggers second delay multivibrator 77. The output waveform of the latter, applied to output terminal 78 in FIG. 4 and as shown in FIG. 5G is a square wave which is positive between the trailing edge of the output of the multivibrator 73 shown in FIG. 5C, and the trailing edge of the delay generated by multivibrator 77 itself, the former occurring at the angle $A_1$ and the latter at the angle $A_2$.

With reference again to FIG. 4, the negative-going edge of the square wave at terminal 70 also actuates (−) pulse shaper 90, whose output at terminal 91 as shown as FIG. 5D, is a pulse coincident with the negative-going edge of the square wave at terminal 70 which actuates the shaper. This positive pulse triggers delay multivibrator 92, in a manner analogous to that employed for delay multivibrators 73 and 77, as hereinbefore described. The output from the delay multivibrator 92 is a longer pulse as shown in FIG. 5E, whose leading or positive-going edge is coincident with the triggering pulse of FIG. 5D which triggers it, and whose trailing or ground-returning edge occurs at an angle $A_3$ which is a function of the delay built into the delay multivibrator 92.

The output of the delay multivibrator 92, at terminal 93, and as shown in FIG. 5E, is shaped by (−) pulse shaper 94 which generates a sharp triggering pulse (shown in FIG. 5H) coincident with the trailing or ground-returning edge of the waveform of FIG. 5E. This pulse of FIG. 5H appearing at terminal 95 at the output of the pulse shaper 94, triggers delay multivibrator 96. The output waveform of multivibrator 96 is applied to output terminal 97 in FIG. 4, and as shown in FIG. 5I is a square wave which is positive between the trailing edge of the output of the multivibrator 92 shown in FIG. 5E, and the trailing edge of the delay generated by multivibrator 96 itself, the former occurring at the angle $A_3$ and the latter at the angle $A_4$.

In the manner just described, the circuit of FIG. 4 generates, in an exemplary manner, the waveforms of FIG. 5G and 5I, from the input waveform of FIG. 5A. These respectively correspond with the necessary waveforms of FIGS. 2C and 2D, the wave of FIG. 2A corresponding with the input wave of FIG. 5A to the terminal 70 in FIG. 4, the point at which the selection among the three basic input phase references applied to terminals 53, 54, and 50 respectively is made.

When the wave applied to terminal 53 is derived from an inphase reference potential, and the wave of terminal 54 is an out-of-phase or quadrature phase reference potential, selection between them via switch 59 affords the advantages of in-phase and quadrature rectification or gated averaging. One also retains the advantages accruing due the instant invention, of insensitivity to several odd harmonics as well as to the even harmonics and 90 degree odd harmonics to which the conventional phase-sensitive rectifier, such as would be constructed in FIG. 1A without switches 10 and 31 and their associated resistors 7 and 28, would also be invariant.

Figure 6:
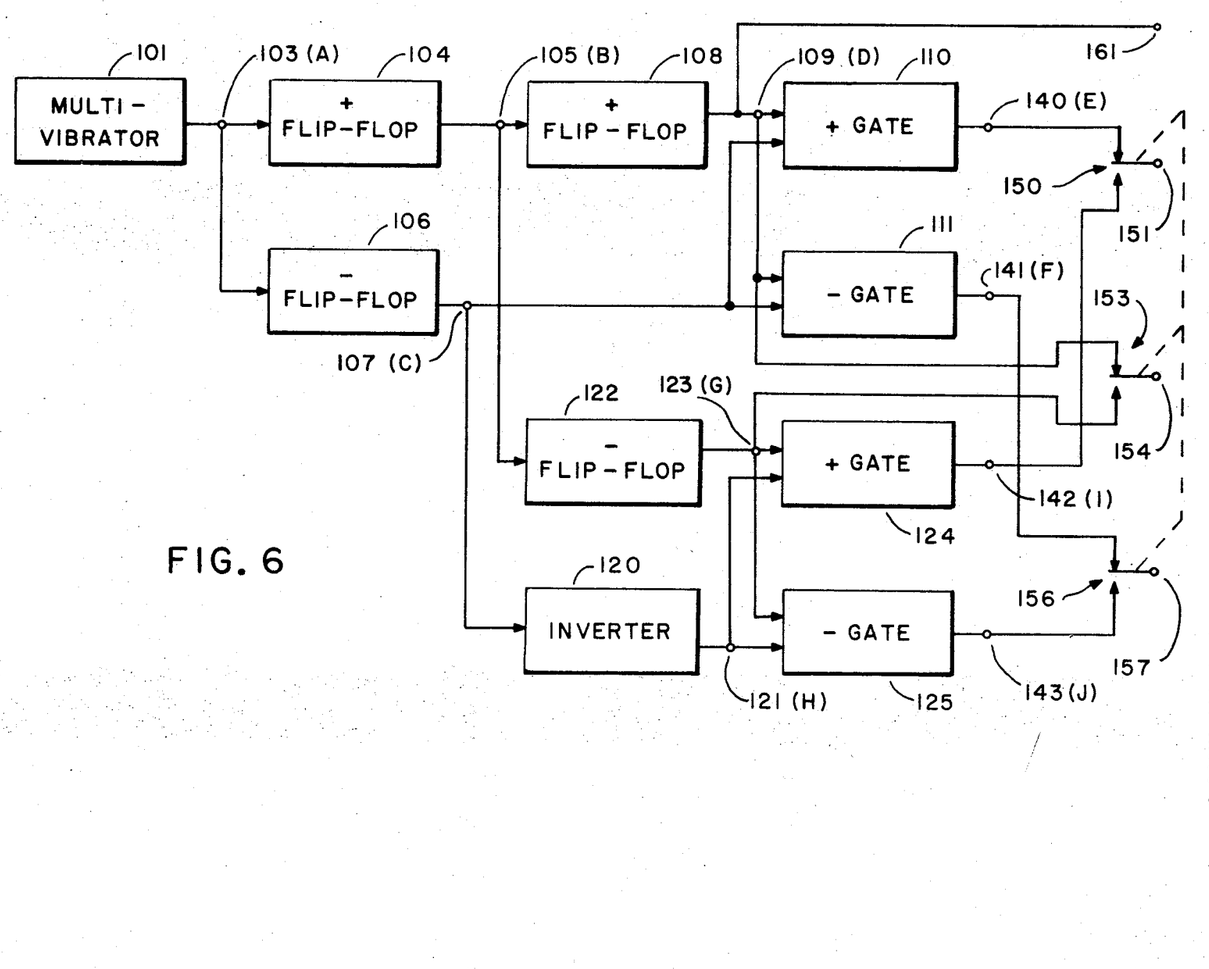
FIG. 6 is a combination block-schematic diagram of a second method of obtaining some of the input waveforms required for the embodiment of FIG. 1.

Referring now to FIG. 6, there is shown another method for obtaining the required gating waveforms of FIGS. 2A, 2C, and 2D for the circuit embodiment of FIG. 1A. However, in this instance the reference waves may be generated within the measuring system, and as a consequence, a higher accuracy may be obtained in establishing the required phase relationships among the gates.

More specifically, the circuitry of FIG. 6 serves to generate all three of the waves of FIGS. 2A, 2C, and 2D, for both in-phase and quadrature situations, while simultaneously making available a reference wave to be applied to the system under test, to evoke the response which is to be measured by the embodiment of FIG. 1A.

Multivibrator 101 in FIG. 6 is a free-running multivibrator, generating a square wave at four times the desired frequency. Its output, applied to terminal 103, is the wave of FIG. 7A, shown reversing every $\pi/4$. It is divided in frequency by flip-flop 104, designated a (+) flip-flop since it triggers or changes state at every positive-going transition of the input applied to it at terminal 103. By ignoring the negative-going transitions, it thereby counts or divides by two, in the manner well-known to those skilled in the art.

The output of flip-flop 104 whose waveform is shown in FIG. 7B is applied via terminal 105 to the input of flip-flop 108, also a (+) triggering flip-flop. The output of the latter, shown in FIG. 7D, is one-half of its input frequency, or one-fourth of the frequency applied to terminal 103 at the output of the free-running multivibrator 101. The output of flip-flop 104 is simultaneously applied to (−) triggering flip-flop 122, whose output changes state for every negative-going input transition. Thus, while the output of flip-flop 122 is the same frequency as the output of flip-flop 108, it is 90 degrees or $\pi/2$ removed from it, thereby providing the required quadrature reference as compared with the in-phase reference provided by the output of flip-flop 108. The output of flip-flop 122 is shown in FIG. 7G as it appears at terminal 123.

It remains to generate the required gates from $\pi/4$ to $3\pi/4$ and from $5\pi/4$ to $7\pi/4$ for the in-phase averaging, and from $3\pi/4$ to $5\pi/4$ and from $7\pi/4$ to $9\pi/4$ for the quadrature averaging. Flip-flop 106, a (−) triggering flip-flop, has its input connected to the output of multivibrator 101 so as to provide at output terminal 107 a square wave of the same frequency as that provided by flip-flop 104, but 90 degrees out of phase with it as shown in FIG. 7C. This signal at terminal 107 is applied, along with the wave from flip-flop 108 to (+) coincidence gate 110, the (+) referring to the fact that when the upper or controlling input to the gate is positive, the gate will generate a positive output whenever the lower input to the gate is simultaneously positive. Thus the coincidence of the waves of FIGS. 7D and 7C is required, resulting in the output from the gate 110 at terminal 140, as shown in FIG. 7E.

In an analogous fashion, (−) gate 111 provides its output terminal with a positive-going wave whenever its upper input is low, coincident with its lower input being positive or high. This requires the coincidence of the ground portion of the wave of FIG. 7D, with the positive portion of the wave of FIG. 7C, resulting in the wave of FIG. 7F at the output terminal 141 from gate 111.

The wave of FIG. 7D then constitutes an in-phase reference suitable for application to terminal 12 of FIG. 1A, and as shown in FIG. 2A. The waves of FIGS. 7E and 7F, derived as hereinbefore described, constitute the intermediate gating waveforms for application to terminals 15 and 16 respectively of FIG. 1A for the in-phase case, and as snown in FIG. 2C and FIG. 2D respectively. Thus, there are provided precision gating signals for the case in which third and fifth harmonics in their 0 degree or in-phase manifestations, are to be prevented from influencing the gated average computed by the embodiment of FIG. 1A. The exemplary circuit of FIG. 6 provides for potentially greater phase accuracy for the gating waveforms than that obtainable by the circuit of FIG. 4 since the phase relationships are fixed in terms of the operation of the flip-flops from a frequency four times the desired actuating frequency. The circuit of FIG. 6, however, is only applicable when the reference frequency can be supplied to the other equipment with which the phase-sensitive converter is to operate. When that other equipment is already generating the basic frequency or wave, as is often the case, then the gating wave generator of FIG. 4 may be employed to advantage.

The out-of-phase or quadrature gate signals, with their subsidiary gate signals, are generated in the circuit of FIG. 6 in a manner analogous to that employed for generating the in-phase gating waveforms of FIG. 7D and their subsidiary gate signals of FIGS. 7E and 7F. Specifically, the quadrature gate signal itself is generated by flip-flop 122, actuated by the output of flip-flop 104 appearing at terminal 105. Since flip-flop 122 is a (−) flip-flop it triggers on the negative-going edges of the wave of FIG. 7B, resulting in a wave of one-fourth the frequency of the wave of FIG. 7A. The wave of FIG. 7C, appearing at the terminal 107 at the output of flip-flop 106 as hereinbefore described, is inverted by inverter 120 to become the wave of FIG. 7H, appearing at terminal 121. It is gated by the output of flip-flop 122 (shown in FIG. 7G) in (+) gate 124, which furnishes its output terminal 142 with a positive potential whenever the gating waveform at terminal 123 is positive, coincident with the gated waveform at terminal 121 (the wave of FIG. 7I) being positive. At (−) gate 125, an output is furnished as a positive potential whenever the gating input at terminal 123 (the wave of FIG. 7G) is negative, coincident with the gated wave at terminal 121 (FIG. 7H) being positive, resulting in the wave of FIG. 7J at the output of gate 125 on terminal 143.

Figure 7:
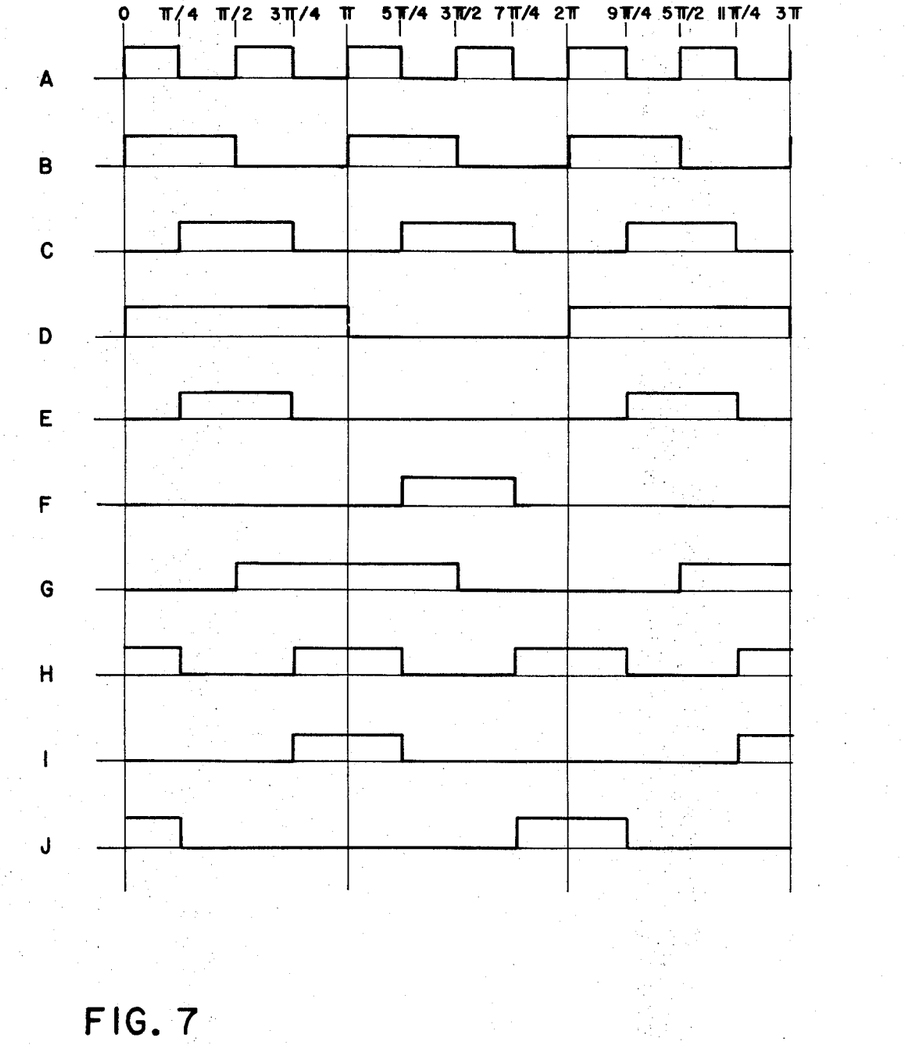
FIG. 7 is a graphical representation showing exemplary waveforms of the circuit of FIG. 6.

The three waves of FIGS. 7G, 7I and 7J appearing at terminals 123, 142 and 143 in FIG. 6 respectively, then constitute a quadrature reference with respect to the primary output from FIG. 6 taken at terminal 161. The primary output at terminal 161 derives from the output of flip-flop 108 at terminal 109. The latter, with associated gain-charging auxiliary or intermediate gating waveforms are intended for application as input waves to terminals 12, 15 and 16 respectively in FIG. 1A. These three input waves, shown as well in FIGS. 2A, 2C and 2D with specific reference to FIG. 1A, are arbitrarily shown at the angles of FIG. 2 with respect to FIG. 1A, and need not correspond with the angles of FIG. 7, in regard to in-phase versus quadrature.

Bipolar switches 153, 150 and 156 in FIG. 6, select between in-phase and quadrature gate signals for application to the harmonic-insensitive gated converter of FIG. 1A. Switch 153 selects between in-phase main gate signal at terminal 109 (the wave of FIG. 7D) and the quadrature or 90-degree out-of-phase gate signal at terminal 123 (the wave of FIG. 7G) for applying the selected gate signal to output terminal 154. Switch 150 selects between the auxiliary gate signals at terminals 140 and 142 (waves of FIGS. 7E and 7I respectively) for the in-phase and quadrature references respectively, for application to terminal 151. Switch 156 selects between the auxiliary gate signals at terminals 141 and 143 (waves of FIGS. 7F and 7J respectively) for the in-phase and quadrature references respectively, for application to terminal 157. All three switches, 153, 150 and 156, can be ganged or mechanically interconnected, for convenience in manual or automatically-selected operation. Thus the outputs from terminals 154, 151 and 157 in FIG. 6 constitute the gating waveforms applied to terminals 12, 15 and 16 in FIG. 1A, for this exemplary method of FIG. 6 for generating the appropriate gating waveforms.

Figure 8:
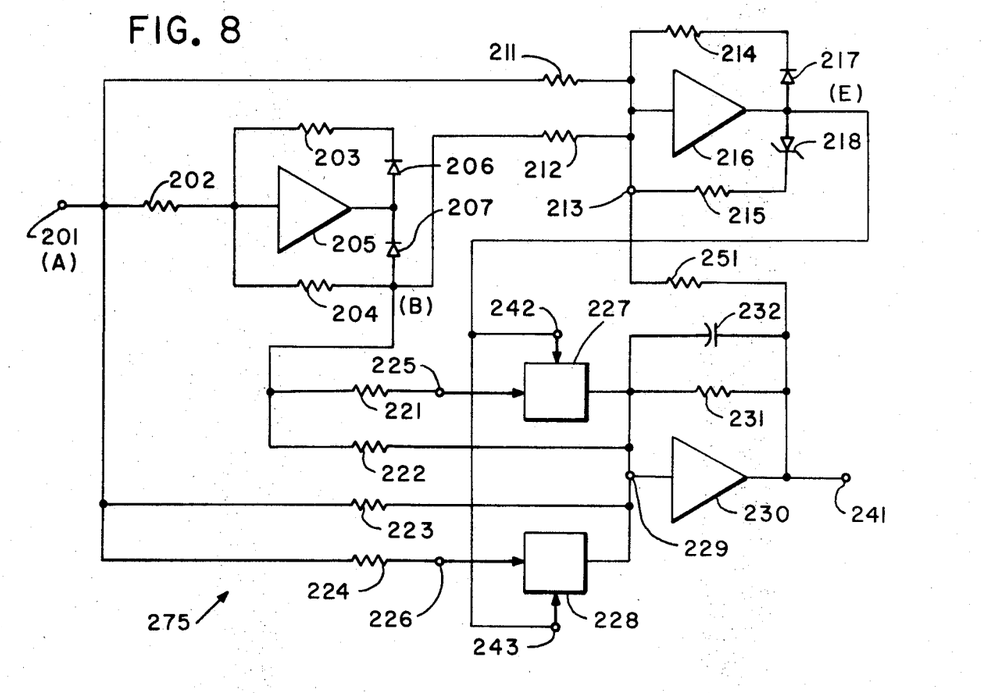
FIG. 8 is a combination block-schematic diagram illustrating a second form of the present invention.

Referring now to FIG. 8, there is shown another specific embodiment of the invention, in which the determination of the angles $A_1$, $A_2$, $A_3$ and $A_4$ with respect to FIG. 3 and the discussion appertaining thereto, is made by a precision clipping action based on comparison of the instantaneous absolute value of the input waveform with the output D.C. potential from a whole-signal or full average, gated converter, incorporating means for performing the precision clipping action and gate generation. Specifically, the input wave applied to system input terminal 201 can be considered as containing an amount of harmonic contamination typical of industrial measurement applications such as three to ten percent for example. Terminal 201 is connected to input resistor 202 of an operational rectifier comprising amplifier 205 with associated parallel feedback diodes 206 and 207 each in series with a respective one of feedback resistors 203 and 204. This circuit is employed to perform the beforementioned absoluting function. For a fuller understanding of such precision rectifiers and absoluting circuits employing operational amplifiers, see the text Electronic Analog and Hybrid Computers, Korn and Korn, McGraw Hill Book Company, 1964, pages 344 and 345, as well as 359 and 360.

For that portion of the output wave from amplifier 205 that is negative-going (which in view of the fact that the negative-gain amplifier is required in order for the operational amplifier technique to work properly (see above-cited reference) implies that the input wave on terminal 201 is concurrently positive-going) diode 207 conducts. The feedback current around the amplifier 205 is then supplied via feedback resistor 204. This generates a precision replica of the input potential for the half-cycle involved, at the junction of diode 207 and resistor 204.

Figure 9:
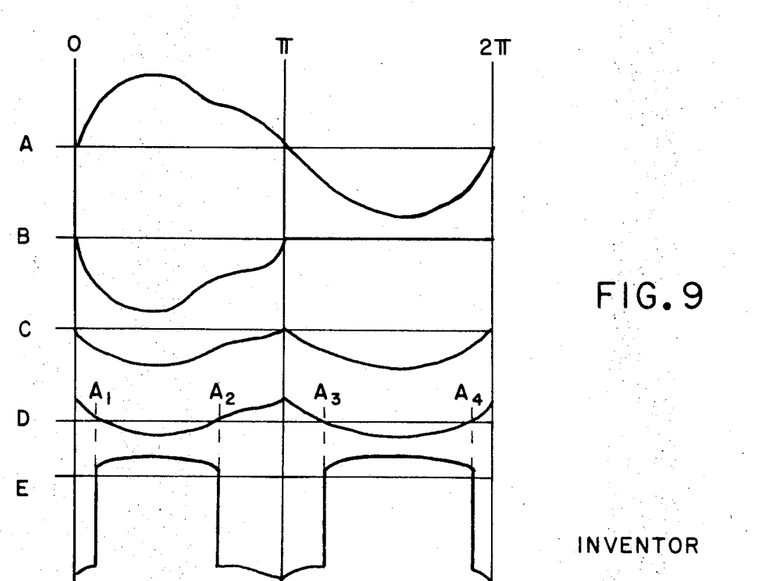
FIG. 9 is a graphical representation showing exemplary waveforms of the embodiment of FIG. 8.

Referring now to FIG. 9, wherein are shown exemplary waveforms from the circuit of FIG. 8, an assumed exemplary input at terminal 201 is shown in FIG. 9A. FIG. 9B shows the waveform at the junction of diode 207 and resistor 204. This waveform of FIG. 9B is the opposite polarity from the wave of FIG. 8A when the latter is positive, and is zero for negative-going input because the other feedback path around amplifier 205 conducts during this period. Thus, amplifier 205 and one of the feedback paths constitutes a half-wave rectifier.

The wave of FIG. 9B appearing at the junction of diode 207 and resistor 204, is summed with the input wave from terminal 201, in another operational amplifier configuration comprising input scaling or weighting resistors 212, 211, and 251. Amplifier 216 exhibits the high gain required of typical analog computing amplifiers, plus split feedback paths consisting of diode 217 and resistor 214 for positive-going feedback potentials, and Zener or breakdown diode 218 and resistor 215 for negative-going feedback potentials. Since resistor 211 connected to terminal 201 is set equal to twice the value of resistor 212 (the latter being connected to the junction of diode 207 and resistor 204), the current into the summing junction 213 of amplifier 216 due to the wave on the input terminal 201, will have half the effect of the current due to the inverted, half-wave rectified form of the input wave appearing at the junction of diode 207 and resistor 204. If these two waves of FIGS. 9A and 9B are summed by themselves, they would therefore appear as in FIG. 9C. The latter is the wave of FIG. 9A with a scale factor of ½ algebraically summed with the wave of FIG. 9B with a scale factor of 1. The scale factors occur in view of the 2:1 ratio between the values of resistors 211 and 212.

There is a third input applied to the amplifier 216, via resistor 251, however. It is the output D.C. potential of the entire harmonic-insensitive gated A.C.-to-D.C. converter 275, appearing on system output terminal 241. This potential is positive, and it therefore offsets the sum of potentials shown in FIG. 9C that would otherwise occur, so that the actual sum that does occur is as shown in FIG. 9D. The height of the waveform of FIG. 9D above the zero volt axis is set by the potential at terminal 241 in conjunction with the third input scaling resistor 251 to amplifier 216.

Amplifier 216 inverts the polarity of the signal shown in FIG. 9D, and splits it into two segments, that which is above the zero axis (via feedback through diode 217 and resistor 214) and that which is below the zero axis (via the second feedback path, through Zener breakdown diode 218 and resistor 215). Thus positive current in the feedback circuit of amplifier 216 flows via diode 217 and resistor 214, creating a positive potential at their junction during the first half cycle between the angles $A_1$ and $A_2$ shown in FIG. 9D, and during the second half cycle between the angles $A_3$ and $A_4$. At all other times, negative current flows in the feedback circuit of amplifier 216 via Zener breakdown diode 218 and resistor 215, creating at their junction a negative potential.

However, in switching from negative feedback current to positive feedback current and vice versa, the amplifier 216 output must jump through or traverse the gap $E_g$ shown in FIG. 9E created by the forward conduction potential of diode 217 plus the Zener breakdown potential of diode 218. FIG. 9E represents the potential waveform that amplifier 216 provides at its output terminal to drive both diodes 217 and 218. This traverse of the diode gaps provides a highly sensitive indication of the points at which the wave of FIG. 9D passes through zero, or the points at which the wave of FIG. 9C equals the selected potential, suitably scaled, that is fed back from the output terminal 241 via resistor 251 to the input of amplifier 216, for comparison purposes. Thus the wave of FIG. 9E provides the required gate between the angles $A_1$ and $A_2$, and between the angles $A_3$ and $A_4$, for gain enhancement for harmonic rejection of two or more, 0 degree odd harmonics specifically.

When resistors 214 and 215 are set to very small values, e.g. zero or short circuit, the variations along the tops and bottoms of the wave of FIG. 9E may be reduced to arbitrarily small values, thereby providing essentially a square-wave gate signal when such is required. Alternatively, when the subsequent circuits which employ the gate signal function properly even in the face of small variations along the tops and bottoms of the gate signal, stability of the amplifier circuit incorporating high gain amplifier 216 may be enhanced by leaving small, non-zero values for the resistors 214 and 215.

The gate output signal of amplifier 216, shown in FIG. 9E, may then be used to gate that portion of the absolute value of the input wave between the angles $A_1$ and $A_2$, and between the angles $A_3$ and $A_4$, in such a way as to increase the gain of the averaging converter to the absolute value of the input signal between those angles, by an amount of equal to $(1+B)$, as described hereinbefore. This confers insensitivity to two or more, 0 degree odd harmonics of the input wave, without changing the basic insensitivity of the averaging process to even harmonics and to 90 degree odd harmonics.

The absolute value of the input wave is generated a second time. This is accomplished by connecting the junction of diode 207 and resistor 204 to the input terminal 229 of operational amplifier 230, and by connecting input terminal 201 through resistor 223 to the input terminal of amplifier 230. This arrangement is analogous to that described in connection with resistors 212, 211 and amplifier 216. The outputs of two gates, 227 and 228 are connected to summing junction 229 and their inputs are respectively connected to auxiliary resistors 221 and 224 which furnish additional gain (in fact equal to B and during the times that gates 227 and 228 are closed) for the two aforementioned signals that are summed to generate the instantaneous absolute value of the input wave, the summing being carried out with appropriate scale factors as hereinbefore described. To this end resistors 221 and 224 are respectively connected to the junction of diode 207 and resistor 204 and to input terminal 201. Gates 227 and 228 are closed from $A_1$ to $A_2$, and from $A_3$ to $A_4$, both gates being also connected so as to be actuated simultaneously by the output signal (shown as FIG. 9E) from amplifier 216 thereby applying additional gain, determined by the relative values of the resistors 221 and 222, and 224 and 223, for the two inputs respectively that go to make up the absolute value as hereinbefore described.

Amplifier 230 has not only the feedback resistor 231, but also feedback capacitor 232 in parallel with resistor 231 to filter out or eliminate the A.C. or ripple components of the output signal, leaving only the D.C. signal which is proportional to the whole average value of the input signal applied to terminal 201, in a manner insensitive to two or more 0 degree odd harmonics.

While the embodiment of FIG. 8A employs continuous filtering, via feedback capacitor 232 of amplifier 230, it is to be understood that the entire computation of the gated, harmonic insensitive average may be carried out on a step-by-step basis: e.g., computing the integral of the absolute value of the input over one cycle divided by time, applying it as input to off-setting resistor 251 for the next such computation, and so on for a number of cycles until the output at terminal 241 converges to a steady-state value. In a hybrid digital-analog system of this character, it is often possible to obtain faster settling of the final D.C. output, if an optimum program is employed. By using the basic implementation of FIG. 8A, the advantages of harmonic insensitivity to two or more 0 degree odd harmonics may be brought to such a hybrid system.

As previously noted, the principles of the present invention are applicable to systems for determining D.C. values over but a single cycle of the input wave. For example, the embodiment shown in FIG. 10, a modification of FIG. 1 wherein like numerals denote like parts, accomplishes this end.

Figure 10:
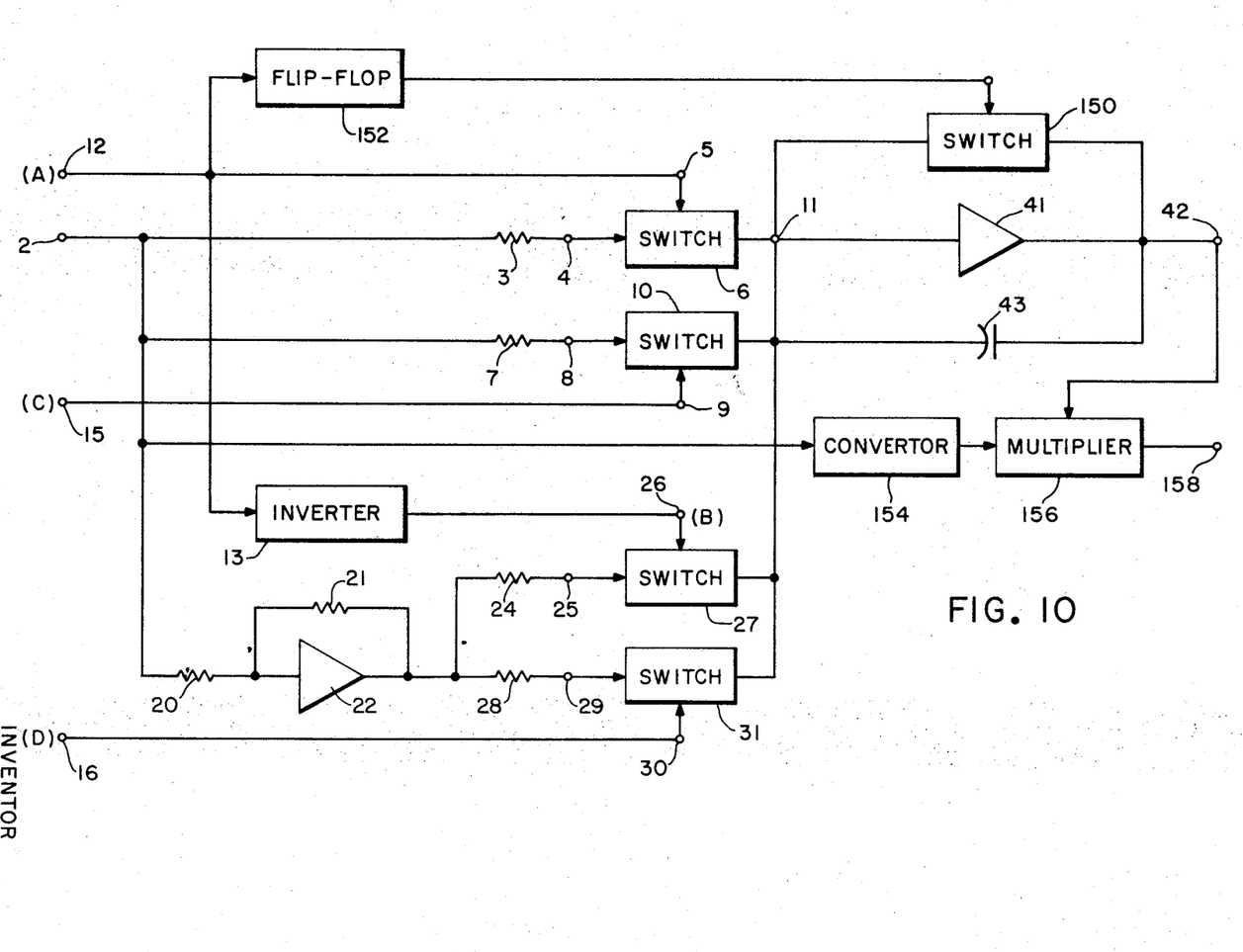
FIG. 10 is a variation of the embodiment shown in FIG. 1.

Referring specifically to FIG. 10 it will be seen that the feedback resistor around amplifier 41 has been replaced with switch 150 having its input and output terminals connected to the output and input respectively of amplifier 41. Switch 150 includes a control terminal connected to the output of bistable device or flip-flop 152, the input of the latter being coupled to terminal 12 at which only a single-cycle control signal is applied. Obviously, the signals applied at terminals 15 and 16 are also then single cycles. Thus, for example, the positive edge of the signal at terminal 12 sets flip-flop 152 which then provides a signal opening switch 150 at phase angle 0 of FIG. 2. The switch remains open until at last $2\pi$, after which time the flip-flop can be reset manually or by other means derived from the next signal at terminal 12. Thus, the output of amplifier 41 which was built up during 0 to $2\pi$ is stored on capacitor 43.

Now, the average value of the input wave can be defined as the integral of the instantaneous absolute value of increments of the wave over the time interval of the measurement (i.e., from 0 to $2\pi$) divided by the time interval. Hence it is necessary to divide the value of the change in the capacitor by time. This is accomplished by either directly dividing by a value equal to the time interval or by multiplying by source value established in accordance with the fundamental frequency of the input wave (inasmuch as $T=1/f$). It will be appreciated that division is merely multiplication by a sub-multiple and hence division and multiplication are in this sense equivalents.

In the form shown then, terminal 2 is connected to the input of converter 154 of the type known as a frequency to D.C. converter which provides an output signal proportional to the frequency of the signal at its input. Hence, the output of converter 154 represents a function of the period of the wave. This output is then connected to one input of multiplier 156, another input of the latter being connected to terminal 42. Multiplier 156 characteristically accepts two input signals X and Y and yields the product XY. Here the product is the integrated output of amplifier 41 over the single cycle multiplied by a function of the wave period (i.e., $1/T$ or $f$). This product, representing the D.C. value of the average for a single cycle of the input wave, is available at terminal 158 which is connected to the output of multiplier 156.

While preferred embodiments of the invention are illustrated in the drawings and have been described herein, modifications which do not depart from the essence of the invention may be made and, indeed, are apparent to those knowledgeable in electronic circuitry. Therefore, it is intended that the invention not be limited by the precise structures which are illustrated, but rather that the scope of the invention be construed in accordance with the appended claims.

What is claimed is:

1. A system for converting a time-varying periodic, complex electrical input wave to D.C., and comprising in combination:
    an A.C.-D.C. converter having an input terminal adapted to have said wave applied thereto;
    means for generating a first group of gating signals of the same periodicity as the fundamental of said wave;
    means for gating said wave to said converter in accordance with said first group of signals; and
    means for altering the gain of said converter during at least one portion of each period of said signals of said first group, between predetermined pairs of phase angles with respect to the fundamental of said wave so as to change the gain of said converter among at least two finite values.

2. A system as defined in claim 1 including means for providing a second group of gating signals for controlling the timing of gain alteration during said portion of each period.

3. A system as defined in claim 1 wherein said means for generating said first group provides signals in either zero or ninety degree phase relationship to said fundamental.

4. A system as defined in claim 1 wherein said means for generating said first group is connected for deriving the latter from said wave.

5. A system as defined in claim 1 wherein said means for generating said first group includes a source electrically for providing said gating signals independently of said wave.

6. A system as defined in claim 2 including means for deriving said second group of gating signals from said first group.

7. A system as defined in claim 1 wherein said converter comprises a filtering operational amplifier having an input summing junction, and
    said means for gating said wave comprises first switching means for coupling said summing junction to said input terminal through a first impedance in accordance with a gating signal of said first group;
    means for inverting said wave;
    second switching means for applying the inverted wave to said summing junction through a second impedance in accordance with another gating signal of said first group.

8. A system as defined in claim 7 including means for providing a second group of gating signals for controlling the timing of gain alteration during said portion of each period and comprising third switching means for connecting said summing junction through a third impedance to said input terminal in accordance with a gating signal of said second group, and fourth switching means for applying said inverted wave through a fourth impedance to said summing junction in accordance with another gating signal of said second group;
    the ratio of magnitudes of said first and third impedances being established for controlling the extent of gain alteration during concurrent conduction of said first and third switching means; and
    the ratio of magnitudes of said second and fourth impedances being established for controlling the extent of gain alteration during concurrent conduction of said second and fourth switching means.

9. A system as defined in claim 1 wherein said means for altering said gain changes the latter by a factor of $(1+\sqrt{2})$.

10. A system as defined in claim 1 wherein said pairs of phase angles with respect to a full cycle of said fundamental are $A_1$, $A_2$ and $A_3$, $A_4$ related such that $$A_2 = \pi - A_1$$
$$A_3 = \pi + A_1$$
$$A_4 = 2\pi - A_1$$

and $$A_1 = 2\pi/(i+j)$$

where $i$ and $j$ are the harmonic numbers of any two zero degree odd harmonics of said input wave, the effect of which harmonics is to be reduced.

11. A system as defined in claim 1 wherein said pairs of phase angles with respect to a full cycle of said fundamentals are $\pi/4$, $3\pi/4$ and $5\pi/4$, $7\pi/4$.

12. A system as defined in claim 2 wherein said means for providing said second group of gating signals comprises
    an input terminal adapted to have a reference rectangular waveform applied thereto;
    means for generating a first pulse responsively to the leading edge of said reference rectangular waveform;
    means for generating a second rectangular waveform responsively to said first pulse and having a duration such that the trailing edge occurs at one phase angle of one of said pairs;
    means for generating a second pulse responsively to and substantially simultaneously with the trailing edge of said second rectangular waveform; and
    means for generating a third rectangular waveform responsively to said second pulse and having a leading edge occurring substantially simultaneously with said second pulse and a trailing edge occurring at the other phase angle of said one of said pairs.

13. A system as defined in claim 12 wherein said means for providing said second group comprises means for generating a third pulse responsively to the trailing edge of said reference rectangular waveform;

means for generating a fourth rectangular waveform responsively to said third pulse and having a duration such that the trailing edge occurs at one phase angle of another of said pairs;

means for generating a fourth pulse responsively to and substantially simultaneously with the trailing edge of said fourth rectangular waveform; and means for generating a fifth rectangular waveform responsively to said fourth pulse and having a leading edge occurring substantially simultaneously with said fourth pulse and a trailing edge occurring at the other phase angle of said another of said pairs.

14. A system as defined in claim 12 wherein said reference waveform defines said first group of gating signals.

15. A system as defined in claim 2 wherein said means for providing said second group of signals and said means for generating said first group comprise a source of first symmetrical rectangular waveforms having a repetition rate of four times the frequency of said fundamental;

means responsive to the leading edges said first rectangular waveforms for generating second symmetrical rectangular waveforms at one-half of said repetition rate;

means responsive to the trailing edges of said first rectangular waveforms for generating third symmetrical rectangular waveforms at one-half of said repetition rate;

means responsive to the leading edges of said second waveforms for generating fourth symmetrical rectangular waveforms at one-quarter of said repetition rate;

first coincidence gate means responsive to the same polarities of said fourth and third waveforms for providing gating signals of said second group for determining one pair of said phase angles; and second coincidence gate means responsive to opposite polarities of said fourth and third waveforms for providing gating signals of said second group for determining another pair of said phase angles.

16. A system as defined in claim 15 including means for inverting said third waveforms to provide fifth rectangular waveforms;

means responsive to the trailing edges of said second waveforms for generating sixth symmetrical rectangular waveforms;

third coincidence gate means responsive to the same polarities of said fifth and sixth waveforms for providing gating signals of said second group for determining a third pair of said phase angles; and fourth coincidence gate means responsive to opposite polarities of said fifth and sixth waveforms for providing gating signals of said second group for determining a fourth pair of said phase angles.

17. A system as defined in claim 16 including switching means operative so that said sixth waveforms define said first group of gating signals when said pairs of phase angles are determined by the outputs of said third and fourth coincidence gates, and said fourth waveforms define said first group of gating signals when said pairs of phase angles are determined by the outputs of said first and second coincidence gates.

18. A system as defined in claim 1 wherein said converter comprises a filtering operational amplifier having a summing junction at its input connected through a weighting impedance to said system input terminal at which said wave is to be applied;

said means for generating said gating signals and said means for altering the gain of said converter comprising a half-wave rectifying device connected for rectifying said input wave and having its output connected through a weighting impedance to said summing junction;

means for summing the output of said half-wave rectifying device, said input wave and the output of said converter all through respective weighting impedances;

axis-crossing detection means for generating signals determining said phase angles whenever the summed waveform from said means for summing changes polarity;

said means for gating comprising first switching means for connecting said summing junction through another weighting impedance to the output of said half-wave rectifier, responsively to one of said signals determining phase angles; and second switching means for connecting said summing junction through a weighting impedance to said system input terminal.

19. A system as defined in claim 1 including means for controlling said converter so that it is operative a cycle of said input wave at a time.

20. A system as defined in claim 19 including means for multiplying the output of said converter by a factor which is a function of the periodicity of said input wave.

21. A system as defined in claim 20 wherein said converter comprises an operational amplifier having a first feedback loop containing an integrating capacitor and a second feedback loop containing said means for controlling, said means for controlling comprising a switch operative to open said second feedback loop in accordance with a signal of said first group, said means for multiplying comprising means for providing a signal which is a function of the frequency of said input wave, and for multiplying the latter signal by the output of said operational amplifier.

References Cited

UNITED STATES PATENTS

| 2,438,518 | 3/1948 | Piety | 324—119 |
|---|---|---|---|
| 2,842,740 | 7/1958 | Sparks | 324—119 XR |
| 3,024,415 | 3/1962 | Burklund et al. | 324—119 XR |
| 3,308,368 | 3/1967 | Schmidt | 321—9 |
| 3,371,269 | 2/1968 | Wattson | 321—10 XR |
| 3,374,425 | 3/1968 | Barditch et al. | 321—10 XR |
| 3,411,066 | 11/1968 | Bravenec | 324—119 XR |
| 3,434,053 | 3/1968 | McKee | 324—132 |

W. M. SHOOP, JR., Primary Examiner

U.S. Cl. X.R.

324—119, 128